US009330336B2

(12) United States Patent
Tajbakhsh et al.

(10) Patent No.: US 9,330,336 B2
(45) Date of Patent: May 3, 2016

(54) SYSTEMS, METHODS, AND MEDIA FOR ON-LINE BOOSTING OF A CLASSIFIER (71) Applicant: Arizona Board of Regents, a body corporate of the State of Arizona, acting for and on behalf of, Arizona State University, Scottsdale, AZ (US)

(72) Inventors: Nima Tajbakhsh, Tempe, AZ (US); Hong Wu, Tempe, AZ (US); Wenzhe Xue, Phoenix, AZ (US); Jianming Liang, Scottsdale, AZ (US)

(73) Assignee: Arizona Board of Regents, a body corporate of the State of Arizona, acting for and on behalf of, Arizona State University, Scottsdale, AZ (US)

( * ) Notice: Subject to any disclaimer, the term of this patent is extended or adjusted under 35 U.S.C. 154(b) by 86 days.

(21) Appl. No.: 13/621,837

(22) Filed: Sep. 17, 2012

(65) Prior Publication Data
US 2013/0070997 A1 Mar. 21, 2013

Related U.S. Application Data (60) Provisional application No. 61/535,933, filed on Sep. 16, 2011.

(51) Int. Cl.
*G06K 9/00* (2006.01)
*G06K 9/62* (2006.01)
(52) U.S. Cl.
CPC ........................................ *G06K 9/62* (2013.01)
(58) Field of Classification Search
None
See application file for complete search history.

(56) References Cited

U.S. PATENT DOCUMENTS

| 7,526,101 | B2 | 4/2009 | Avidan |
|---|---|---|---|
| 7,840,061 | B2 | 11/2010 | Porikli et al. |
| 8,812,431 | B2 | 8/2014 | Voigt et al. |
| 2003/0199762 | A1 | 10/2003 | Fritz et al. |
| 2005/0220336 | A1 | 10/2005 | Sabe et al. |
| 2005/0228276 | A1 | 10/2005 | He et al. |
| 2006/0204121 | A1* | 9/2006 | Bryll .................... G06K 9/6288 382/255 |
| 2007/0280530 | A1 | 12/2007 | Fung et al. |
| 2008/0009733 | A1 | 1/2008 | Saksena |
| 2008/0027887 | A1* | 1/2008 | Barbu .................. G06N 99/005 706/25 |
| 2008/0154565 | A1 | 6/2008 | Florin et al. |
| 2008/0171939 | A1 | 7/2008 | Ishihara |
| 2008/0192887 | A1 | 8/2008 | Weese et al. |

(Continued)

OTHER PUBLICATIONS

Hong Wu ("Offline and Online Adaboost for Detecting Anatomical Structures" Thesis paper from Arizona State University, Aug. 2011, hereafter referred to as Wu).*

(Continued)

*Primary Examiner* — Aaron W Carter
*Assistant Examiner* — Oneal R Mistry
(74) *Attorney, Agent, or Firm* — Byrne Poh LLP (57) ABSTRACT

Systems, methods, and media for on-line boosting of a classifier are provided, comprising: receiving a training sample; for each of a plurality of features, determining a feature value for the training sample and the feature, using the feature value to update a histogram, and determining a threshold for a classifier of the feature; for each of the plurality of features, classifying the training sample using the threshold for the classifier of the feature and calculating an error associated with the classifier; selecting a plurality of best classifiers from the classifiers; and, for each of the plurality of best classifiers, assigning a voting weight to the one of the plurality of best classifiers.

21 Claims, 4 Drawing Sheets (56) References Cited

U.S. PATENT DOCUMENTS

| | | | |
|---|---|---|---|
| 2008/0205750 A1* | 8/2008 | Porikli et al. | 382/159 |
| 2008/0240532 A1* | 10/2008 | Carneiro et al. | 382/131 |
| 2008/0260230 A1 | 10/2008 | Gotardo et al. | |
| 2009/0034816 A1 | 2/2009 | Ghanem et al. | |
| 2009/0060307 A1 | 3/2009 | Ghanem et al. | |
| 2009/0175515 A1 | 7/2009 | Schummers | |
| 2009/0252394 A1 | 10/2009 | Liang et al. | |
| 2010/0046815 A1 | 2/2010 | Von Berg et al. | |
| 2010/0061601 A1 | 3/2010 | Abramoff et al. | |
| 2010/0098308 A1 | 4/2010 | Lakare et al. | |
| 2010/0113930 A1 | 5/2010 | Miyachi | |
| 2010/0177944 A1 | 7/2010 | Madabhushi et al. | |
| 2010/0202681 A1* | 8/2010 | Ai | G06K 9/6257 382/159 |
| 2011/0191283 A1 | 8/2011 | Voigt et al. | |
| 2011/0270089 A1 | 11/2011 | Vezina | |
| 2011/0293157 A1 | 12/2011 | Ye et al. | |
| 2012/0089545 A1* | 4/2012 | Mei et al. | 706/20 |
| 2012/0106815 A1 | 5/2012 | Yang et al. | |
| 2012/0274755 A1* | 11/2012 | Sinha et al. | 348/77 |
| 2014/0185887 A1* | 7/2014 | Wu | G06K 9/6231 382/128 |

OTHER PUBLICATIONS

Alonso-Martinez, J.L., et al., "Delay and misdiagnosis in sub-massive and non-massive acute pulmonary embolism", in European Journal of Internal Medicine, vol. 21, No. 4, Aug. 2010, pp. 278-282.
Araoz, P.A., et al., "Helical ct pulmonary angiography predictors of in-hospital morbidity and mortality in patients with acute pulmonary embolism", in Journal of Thoracic Imaging, vol. 18, Oct. 2003, pp. 207-216.
Bottiger, B.W., et al., "Inhaled nitric oxide selectively decreases pulmonary artery pressure and pulmonary vascular resistance following acute massive pulmonary microembolism in piglets," in Chest, vol. 110, No. 4, Oct. 1996, pp. 1041-1047.
Collomb, J., et al., "Severity Assessment of Acute Pulmonary Embolism: Evaluation using Helical CT," in European Radiology, vol. 13, No. 7, Feb. 2003, pp. 1508-1514.
Dias-Junior, C.A., "The effect of sildenafil on pulmonary embolism-induced oxidative stress and pulmonary hypertension", in Anesthesia & Analgesia, vol. 101, No. 1, Jul. 2005, pp. 115-120.
Ghaye, B., et al., "Can CT Pulmonary Angiography Allow Assessment of Severity and Prognosis in Patients Presenting with Pulmonary Embolism? What the Radiologist Needs to Know," in RadioGraphics, vol. 26, Jan. 2006, pp. 23-29.
Ghaye, B., et al., "Severe pulmonary embolism: pulmonary artery clot load scores and cardiovascular parameters as predictors of mortality," in Radiology, vol. 239, Apr. 2006, pp. 884-891.
Grifoni, S.,"Short-term clinical outcome of patients with acute pulmonary embolism, normal blood pressure, and echocardiographic right ventricular dysfunction," in Circulation, vol. 101, No. 24, Jun. 2000, pp. 2817-2822.
Jardin, F., et al., "Echocardiographic pattern of acute cor pulmonale," in Chest, vol. 111, No. 1, Jan. 1997, pp. 209-217.
Kass, M., et al., "Snakes: Active contour models," in International Journal of Computer Vision, vol. 1, No. 4, Jan. 1988, pp. 321-331.
Levenberg, K., "A method for the solution of certain non-linear problems in least squares", in Quarterly Journal of Applied Mathmatics, vol. 2, Jul. 1944, pp. 164-168.
Liang, J., et al., "United Snakes", in Medical Image Analysis, vol. 10 No. 2, Apr. 2006, vol. 215-233.
Mansencal, N., "Comparison of different echocardiographic indexes secondary to right ventricular obstruction in acute pulmonary embolism," in The American Journal of Cardiology, vol. 92, No. 1, Jul. 2003, pp. 116-119.
Marquardt, D.W., "An Algorithm for Least-Squares Estimation of Nonlinear Parameters," in SIAM Journal on Applied Mathematics, vol. 11 No. 2, Jun. 1963, pp. 431-441.
Mastora, I., "Severity of acute pulmonary embolism: evaluation of a new spiral ct angiographic score in correlation with echocardiographic data", in European Radiology, vol. 13, Jan. 2003, pp. 29-35.
McConnell, M.V., et al., "Regional right ventricular dysfunction detected by echocardiography in acute pulmonary embolism," in The American Journal of Cardiology, vol. 78 No. 4, Aug. 1996, pp. 469-473.
Ribeiro, A., et al., "Echocardiography doppler in pulmonary embolism: Right ventricular dysfunction as a predictor of mortality rate," in American Heart Journal, vol. 134, No. 3, Mar. 1997, pp. 479-487.
Tajbakhsh, N., et al., "Motion analysis of right ventricular dysfunction under mild and moderate pressure overload caused by acute pulmonary embolism", in Ultrasound in Medicine and Biology, vol. 39, No. 11, Nov. 2013, pp. 2066-2074.
Tajbakhsh, N., et al., "Shape-based analysis of right ventricular dysfunction associated with acute pulmonary embolism", in SPIE Medical Imaging, vol. 8317, Mar. 2012, pp. 83170G-83170G.
Takamura, T., et al., "Reversible left ventricular regional non-uniformity quantified by speckle-tracking displacement and strain imaging in patients with acute pulmonary embolism," in Journal of the American Society of Echocardiography, vol. 24, No. 7, Apr. 2011, pp. 792-802.
Wu, H., et al. "Self-Adaptive Asymmetric On-line Boosting for Detecting Anatomical Structures", in SPIE Medical Imaging, vol. 8315, Feb. 2012, pp. 831539-831539.
"Deep Vein Thrombosis Overview", Technical Report, Society of Interventional Radiology, last accessed Sep. 17, 2014, pp. 1-3, available at: http://www.sirweb.org/patients/deep-vein-thrombosis/.
Bi, J. and Liang, J., "Multiple instance learning of pulmonary embolism detection with geodesic distance along vascular structure", in Proceedings of IEEE Computer Society Conference on Computer Vision and Pattern Recognition (CVPR) Jun. 17-22, 2007, Minneapolis, MN, USA, pp. 1-8.
Bouma, H., "Vessel-Diameter Quantification and Embolus Detection in CTA Images." Ph.D. Thesis, Eindhoven University of Technology, PrintPartners, Ipskamp, The Netherlands, Apr. 2008, pp. 9-133.
Bouma, H., et al, "Automatic Detection of Pulmonary Embolism in CTA Images", in IEEE Transactions on Medical Imaging, vol. 28, No. 8, Aug. 2009, pp. 1223-1230.
Bourdev, L. and Brandt, J., et al., "Robust Object Detection Via Soft Cascade", in Proceedings of the 2005 IEEE Conference on Computer Vision and Pattern Recognition (CVPR '05), Washington, DC, USA, Jun. 2005, pp. 236-243.
Chartrand-Lefebvre, C., "Computed tomography angiography in the diagnosis of pulmonary embolism: Interobserver agreement", in American Journal of Emergency Medicine, Jan. 27, 2011, pp. 118-119.
Cho, E.J., et al., "Right ventricular free wall circumferential strain reflects graded elevation in acute right ventricular afterload", in Am J Physiol Heart Circ Physiol., Feb. 2009, vol. 296, No. 2, pp. 818-824.
Costantino, G., et al., "Interobserver agreement in computer tomography readings for pulmonary embolism", in American Journal of Emergency Medicine, Jan. 27, 2011, pp. 119.
Costantino, G., et al., "Interobserver agreement in computer tomography readings for pulmonary embolism", in American Journal of Emergency Medicine, vol. 27, No. 9, Nov. 2009, pp. 1109-1111.
Craig, J.J., "Introduction to Robotics: Mechanics and Control", 3rd edition, Prentice Hall, Aug. 6, 2004, pp. 1-385.
Criminisi, A., et al., "Regression Forests for Efficient Anatomy Detection and Localization in CT Studies", in Proceedings of the International Workshop on Medical Computer Vision, Beijing, CN, Sep. 2010, pp. 106-117.
Crow, F.C., "Summed-Area Tables for Texture Mapping", in Computer Graphics, vol. 18, No. 3 Jul. 1984, pp. 207-212.
Dinesh, M.S., et al, "Adaptive Contrast-Based Computer Aided Detection for Pulmonary Embolism", in Proceedings of the SPIE International Society Conference for Optimal Engineering, Mar. 2009, vol. 7260, No. 726010, pp. 1-8.

(56) References Cited

OTHER PUBLICATIONS

Dollar, P., et al., "Multiple Component Learning for Object Detection", in Proceedings of the 10th European Conference on Computer Vision: Part II (ECCV '08), Marseille, FR, Oct. 12-18, 2008, pp. 211-224.

Dousset, M., et al., "Principles and performance of virtual CT and MIRA intraluminal endoscopy", in Virtual Endoscopy, Springer, Nov. 2002, pp. 1-19.

Frangi, A.F., et al., "Multiscale vessel enhancement filtering", in Medical Image Computing and Computer-Assisted Intervention, Oct. 11-13, 1998, pp. 130-137.

Freund, Y. and Schapire, R.E., "A Decision-Theoretic Generalization of On-Line Learning and an Application to Boosting", in Journal of Computer and System Sciences, vol. 55, No. 1, Aug. 1997, pp. 119-139.

Freund, Y. and Schapire, R.E., "A Short Introduction to Boosting", in Journal of Japanese Society for Artificial Intelligence, vol. 14, No. 5, Sep. 1999, pp. 771-780.

Galson, S.K., "The surgeon general's call to action to prevent deep vein thrombosis and pulmonary embolism", Technical Report, U.S. Public Health Services, Sep. 15, 2008, pp. 1-35.

Godec, M., et al., "On-line Random Naive Bayes for Tracking", in Proceedings of the 20th International Conference (ICPR '10), Istanbul, TR, Aug. 23-26, 2010, pp. 3545-3548.

Goldstein, H., "Classical Mechanics", 2nd Edition, Jul. 1980, pp. 1-2.

Grabner, H. and Bischof, H., "On-line Boosting and Vision", in Proceedings of the IEEE Computer Society Conference on Computer Vision and Pattern Recognition (CVPR '06), New York, NY, USA, Jun. 17-22, 2006, pp. 260-267.

Grbovic, M. and Vucetic, S., "Tracking Concept Change with Incremental Boosting by Minimization of the Evolving Exponential Loss", in Proceedings of the European Conference on Machine Learning and Knowledge Discovery in Databases, Athens, GR, Sep. 5-9, 2011, pp. 516-532.

Groth, M., et al., "Correlation of right ventricular dysfunction parameters and pulmonary vascular obstruction score in acute pulmonary embolism in a porcine model", in Emergency Radiology, Sep. 2010, pp. 367-374.

He, H., et al., "Incremental Learning from Stream Data," in IEEE Transactions on Neural Networks, vol. 22, No. 12, Dec. 2011, pp. 1901-1914.

International Patent Application No. PCT/US2013/024675, filed Feb. 4, 2013.

International Patent Application No. PCT/US2013/024677, filed Feb. 4, 2013.

International Preliminary Report on Patentability dated Aug. 22, 2013 in International Patent Application No. PCT/US2012/024925.

International Preliminary Report on Patentability in International Application No. PCT/US2012/024907, filed Feb. 13, 2012, mailed Aug. 22, 2013.

International Search Report in International Patent Application No. PCT/US2012/024925, filed Feb. 13, 2012, mailed Jun. 19, 2012.

International Search Report in International Patent Application No. PCT/US2013/024675, filed Feb. 4, 2013, mailed Apr. 16, 2013.

International Search Report in International Patent Application No. PCT/US2013/024677, filed Feb. 4, 2013, mailed Apr. 15, 2013.

Kanitsar, A., et al., "CPR—Curved Planar Reformation", in Proceedings of IEEE Visualization, Nov. 1, 2002, pp. 37-44.

Kim, T.K., et al., "Online Multiple Classier Boosting for Object Tracking", in Proceedings of the 2010 IEEE Computer Society Conference on Computer vision and Pattern Recognition Workshops (CVPRW '10), San Francisco, CA, USA, Jun. 13-18, 2010, pp. 1-6.

Kiraly, A.P., et al., "Cartwheel projections of segmented pulmonary vasculature for the detection of pulmonary embolism", in Medical Imaging: Visualization, Image-Guided Procedures, and Display, Proc. SPIE 5744, Apr. 12, 2005, pp. 69-78.

Knutsson, H., "Representing Local Structure using Tensors", in Proceedings of the 6th Scandinavian Conference on Image Analysis, Oulu, Finland, Jun. 1989, pp. 244-251.

Kothe, U., "Edge and Junction Detection with an Improved Structure Tensor", in Proceedings of the 25th DAGM Symposium on Pattern Recognition, Magdeburg, DE, Sep. 10-12, 2003, pp. 25-32.

Kurkure, U., et al., "Automated Segmentation of Thoracic Aorta in Non-Contrast CT Images", in Proceedings of the 5th International Symposium on Biomedical Imaging: From Nano to Macro (ISBI '08), Paris, FR, May 14-17, 2008, pp. 29-32.

Leistner, C., et al., "On Robustness of On-Line Boosting—A Competitive Study", in Proceedings of the 2009 IEEE 12th International Conference on Computer Vision Workshops (ICCVW '09), Kyoto, JP, Sep. 27-Oct. 4, 2009, pp. 1362-1369.

Liang, J. and Bi, J., "Computer Aided Detection of Pulmonary Embolism with Tobogganing and Multiple Instance Classification in CT Pulmonary Angiography", in Proceedings of the 20th Intl Conference of Information Processing in Medical Imaging Kerkrade, NL, Jul. 2-6, 2007, pp. 630-641.

Liang, J. and Bi, J., "Local Characteristic Features for Computer-Aided Detection of Pulmonary Embolism in CT Angiography", in Proceedings of the First Workshop on Pulmonary Image Analysis, New York, NY, US, Sep. 6, 2008, pp. 263-272.

Liu, D., et al., "Search strategies for multiple landmark detection by submodular maximization", IEEE Conference on Computer Vision and Pattern Recognition, Jun. 3-8, 2010, San Francisco, CA, USA, pp. 2831-2838.

Liu, X. and Yu, T., "Gradient Feature Selection for Online Boosting", in Proceedings of the IEEE 11TH International Conference on Computer Vision (ICCV '07), Rio de Janeiro, BR, Oct. 14-21, 2007, pp. 1-8.

Lorenz, C., et al., "Multi-scale line segmentation with automatic estimation of width, contrast and tangential direction in 2-D and 3-D medical images", in Proceedings of the 1st Joint Conference on CVRMed-MRCAS, London, UK, Mar. 19-22, 1997, pp. 233-242.

Masutani, Y., et al., "Computerized Detection of Pulmonary Embolism in Spiral CT Angiography Based on Volumetric Image Analysis", in IEEE Transactions on Medical Imaging, vol. 21, No. 12, Dec. 2002, pp. 1517-1523.

Office Action dated Aug. 16, 2013 in U.S. Appl. No. 13/984,800.

Office Action dated Aug. 23, 2013 in U.S. Appl. No. 13/984,808.

Office Action dated Oct. 7, 2013 in U.S. Appl. No. 14/023,380.

Office Action dated Sep. 18, 2013 in European Patent Application No. 12744949.4.

Ouellette, D.R., et al., "Pulmonary Embolism", Medscape.com, last updated Sep. 4, 2014, available at: http://emedicine.medscape.com/article/300901-overview#showall, pp. 1-24.

Oza, N. C. and Russell, S., "Online Bagging and Boosting", in 8th International Workshop on Artificial Intelligence and Statistics, Key West, FL, USA, Jan. 2001, pp. 105-112.

Parag, T., et al., "Boosting Adaptive Linear Weak Classifiers for Online Learning and Tracking", in Proceedings of the IEEE Conference on Computer Vision and Recognition (CVPR '08), Anchorage, AK, USA, Jun. 23-28, 2008, pp. 1-8.

Parikh, D. and Polikar, R., "An Ensemble-Based Incremental Learning Approach to Data Fusion", in IEEE Transactions on Systems, Man, Cybernetics, Part B: Cybernetics, vol. 37, No. 2, Apr. 2007, pp. 437-450.

Pelossof, R., et al., "Online Coordinate Boosting", in Proceedings of the 2009 IEEE 12th International Conference on Computer Vision Workshops, (ICCVW '09), Kyoto, JP, Sep. 27-Oct. 4, 2009, pp. 1354-1361.

Pham, M. and Cham, T., "Detection with Multi-exit Asymmetric Boosting", in Proceedings of the IEEE Conference on Computer Vision and Pattern Recognition (CVPR '08), Anchorage, AK, USA, Jun. 23-28, 2008, pp. 1-8.

Pham, M. and Cham, T., "Fast Training and Selection of Haar Features Using Statistics in Boosting-Based Face Detection", in Proceedings of the IEEE 11th International Conference on Computer Vision (ICCV '07), Rio de Janeiro, BR, Oct. 14-21, 2007, pp. 1-7.

Pham, M. and Cham, T., "Online Learning Asymmetric Boosted Classifiers for Object Detection", in Proceedings of the IEEE Conference on Computer Vision and Recogition (CVPR '07), Minneapolis, MN, USA, Jun. 17-22, 2007, pp. 1-8.

Sato, Y. et al., "3-D multi-scale line filter for segmentation and visualization of curvilinear structures in medical images", in Proceedings (56) References Cited

OTHER PUBLICATIONS of the 1st Joint Conference on Computer Vision, Virtual Reality and Robotics in Medicine and Medical Robotics and Computer-Assisted Surgery, London, UK, Mar. 19-22, 1997, pp. 213-222.
Schapire, R. E. and Singer, Y., "BoosTexter: A Boosting-Based System for Text Categorization", in Machine Learning, vol. 39, No. 2, May 1, 2000, pp. 135-168.
Schapire, R. E., "Theoretical Views of Boosting and Applications", in Algorithmic Learning Theory, Lecture Notes in Computer Science, vol. 1720, Dec. 1999, pp. 13-25.
Sebbe, R., "Computer-aided Diagnosis of Pulmonary Embolism in Opacified CT Images", Ph.D. Dissertation, Faculte Polytechnique de Mons, Universitaires de Louvain, Belgium, Feb. 20, 2007, pp. 1-124.
Simon, M., et al., "Paddle-wheel CT display of pulmonary arteries and other lung structures: a new imaging approach", in American Journal of Roentgenology, Jul. 2001, pp. 195-198.
Simon, M., et al., "Paddle-wheel multislice helical CT display of pulmonary vessels and other lung structures", in Radiologic Clinics of North America, May 2003, pp. 617-626.
Stein, P.D. and Hull, R.D., "Multidetector computed tomography for the diagnosis of acute pulmonary embolism", in Current Opinion Pulmonary Medicine, Sep. 2007, pp. 384-388.
Stein, P.D. and Matta, F., "Acute Pulmonary Embolism", in Current Problems in Cardiology, vol. 35, No. 7, Jul. 2010, pp. 314-376.
Sternig, S., et al., "Transient Boost: On-line Boosting with Transient Data", in Proceedings of the 2010 IEEE Computer Society Conference on Computer Vision and Pattern Recognition Workshops (CVPRW '10), San Francisco, CA, USA, Jun. 13-18, 2010, pp. 22-27.
Torbicki, A., et al., "Guidelines on the diagnosis and management of acute pulmonary embolism of the European Society of Cardiology", in Eur Heart J., vol. 29, No. 18, Sep. 2008, pp. 2276-2315.
Vaidehi, V., et al., "Multiclass Object Detection System in Imaging Sensor Network Using Haar-like Features and Joint-Boosting Algorithm", in Proceedings of the 2011 International Conference on Recent Trends in Information Technology (ICRTIT '11), Chennai, Tamil Nadu, IN, Jun. 3-5, 2011, pp. 1011-1015.
Viola, P. and Jones M., "Fast and Robust Classification Using Asymmetric AdaBoost and a Detector Cascade", in Proceedings of the Annual Conference on Neural Information Processing Systems, Vancouver, BC, CA, Dec. 3-8, 2001, pp. 1311-1318.
Viola, P. and Jones, M., "Rapid Object Detection using a Boosted Cascade of Simple Features", in Proceedings of the IEEE Computer Society Conference on Computer Vision and Pattern Recognition, Kauai, HI, USA. Dec. 8-14, 2001, pp. 511-518.
Written Opinion in International Patent Application No. PCT/US2012/024925, filed Feb. 13, 2012, mailed Jun. 19, 2012.
Written Opinion in International Patent Application No. PCT/US2013/024675, filed Feb. 4, 2013, mailed Apr. 16, 2013.
Written Opinion in International Patent Application No. PCT/US2013/024677, filed Feb. 4, 2013, mailed Apr. 15, 2013.
Wu, B. and Nevatia, R., "Improving Part Based Object Detection by Unsupervised, Online Boosting", in Proceedings of the IEEE Conference on Computer Vision and Pattern Recognition (CVPR '07), Minneapolis, MN, USA, Jun. 17-22, 2007, pp. 1-8.
Wu, H., et al., "Machine Learning based Automatic Detection of Pulmonary Trunk", in Proceedings of the SPIE Conference on Medical Imaging 2011: Computer-Aided Diagnosis, Lake Buena Vista, FL, USA, Feb. 12, 2011, vol. 7963, pp. 1-6.
Zheng, Y., et al., "Automatic Aorta Segmentation and Valve Landmark Detection in C-Arm CT: Application to Aortic Valve Implantation", in IEEE Transactions on Medical Imaging, vol. 31, No. 12, Dec. 2012, pp. 2307-2321.
Zheng, Y., et al., "Fast Automatic Heart Chamber Segmentation from 3D CT Data Using Marginal Space Learning and Steerable Features", in Proceedings of the IEEE 11th International Conference on Computer Vision (ICCV '07), Rio de Janeiro, BR, Oct. 14-21, 2007, pp. 1-8.
Zhou, C., et al., "Automatic Pulmonary Vessel Segmentation in 3D Computed Tomographic Pulmonary Angiographic (CTPA) Images", in Proceedings of the SPIE 6144, Medical Imaging: Image Processing, Mar. 15, 2006, pp. Q1-Q7.
Zhou, S. K., et al., "A Boosting Regression Approach to Medical Anatomy Detection", in Proceedings of the IEEE Conference on Computer Vision and Pattern Recognition (CVPR '07), Minneapolis, MN, USA, Jun. 17-22, 2007, pp. 1-8.
Zou, X., et al., "Anatomy-Based Automatic Detection and Segmentation of Major Vessels in Thoracic CTA Images", in Computerized Medical Imaging and Graphics, vol. 30, No. 5, Jul. 2006, pp. 299-313.
Frangi, A.F., et al., "Model-Based Quantitation of 3-D Magnetic Resonance Angiographic Images", in IEEE Transaction on Medical Imaging, vol. 18, No. 10, Oct. 1999, pp. 946-956.
Office Action dated Apr. 24, 2015 in U.S. Appl. No. 14/023,380.
Howard, G., et al., "For the ARIC Investigators: Carotid artery intimal-medial thickness distribution in general populations as evaluated by B-mode ultrasound," In Stroke, vol. 24, No. 9, Sep. 1993, pp. 1297-1304.
Hurst, R., et al., "Clinical use of carotid intima-media thickness: review of the literature," In Journal of the American Society of Echocardiography, vol. 20, No. 7, Jul. 2007, pp. 907-914.
Li, S., et al., "Childhood cardiovascular risk factors and carotid vascular changes in adulthood: the Bogalusa Heart Study," In Journal of the American Medical Association, vol. 290, Nov. 2003, pp. 2271-2276.
Office Action dated Jan. 22, 2015 in U.S. Appl. No. 14/376,181.
Stein, J., et al., "A semiautomated ultrasound border detection program that facilitates clinical measurement of ultrasound carotid intima-media thickness," In Journal of the American Society of Echocardiography, vol. 18, No. 3, Mar. 2005, pp. 244-251.
Stein, J., et al., "Use of Carotid Ultrasound to Identify Subclinical Vascular Disease and Evaluate Cardiovascular Disease Risk," In Journal of the American Society of Echocardiography, vol. 21, No. 2, Apr. 2008, pp. 93-111.
Stein, J., et al., "Vascular age: Integrating carotid intima-media thickness measurements with global coronary risk assessment," In Clinical Cardiology, vol. 27, No. 7, Jul. 2004, pp. 388-392.
Office Action dated Sep. 21, 2015 in U.S. Appl. No. 13/984,808.
Office Action dated Nov. 27, 2015 in U.S. Appl. No. 14/376,568.

\* cited by examiner

Input:
Training samples $S = (x_t, y_t), y_t \in \{1, -1\}, t = 1, 2, ..., T$
A feature pool containing $M$ features
Number of features to be selected, $N$ ($N < M$)
Maximum number of classification attempts, $N_{att}$ Initialize:
Initialize each weak learner: $\lambda_m^{corr} = 1$ and $\lambda_m^{wrong} = 1$ Learning process
for $t = 1, 2, ..., T$
   {Step 0: Initialize parameters}
   $\lambda = 1$    {Initialize the importance weight}
   $i = 1$    {Initialize the number of attempts}
   $\Phi = \{\}$    {Initialize the set of selected weak learners}
   while $i \leq N_{att}$
     {Step 1: Update all weak learners}
     for $m = 1, 2, ..., M$
       $WL_m = update(x_t, y_t, WL_m)$
     end for
     {Step 2: Selects the best N features}
     for $n = 1, 2, ..., N$
       {Step 2.1: Reward and Punish each weak learner}
       for $m = 1, 2, ..., M$
         if $WL_m(x_t) = y_t$
           $\lambda_m^{corr} = \lambda_m^{corr} + \lambda$    {correct decision}
         else
           $\lambda_m^{wrong} = \lambda_m^{wrong} + \lambda$    {wrong decision}
         end if
         $error_m = \frac{\lambda_m^{wrong}}{\lambda_m^{corr} + \lambda_m^{wrong}}$
       end for
       {Step 2.2: Select the best weak learner}
       $m^* = \arg\min_{(m \notin \Phi)} error_m$
       Add $m^*$ to set $\Phi$
       {Step 2.3: Calculate the voting weight}
       $\alpha_n = \frac{1}{2}\ln(\frac{1 - error_{m^*}}{error_{m^*}})$
       {Step 2.4: Update $\lambda$}
       if $WL_n^*(x_t) = y_t$
         $\lambda = \frac{\lambda}{2(1 - error_{m^*})}$    {correct decision}
       else
         $\lambda = \frac{\lambda}{2(error_{m^*})}$    {wrong decision}
       end if
     end for
     {Step 3: Classify after updating}
     $F(x_t) = sign(\sum_{j \in \Phi} \alpha_j \times WL_j(x_t))$
     if $F(x_t) = y_t$
       break    (no further attempts)
     else
       $i = i + 1$
     end if
   end while
end for Output
Final classifier $F(x) = sign(\sum_{j \in \Phi} \alpha_j \times WL_j(x))$

SYSTEMS, METHODS, AND MEDIA FOR ON-LINE BOOSTING OF A CLASSIFIER

CROSS REFERENCE TO RELATED APPLICATION

This application claims the benefit of U.S. Provisional Patent Application No. 61/535,933, filed Sep. 16, 2012, which is hereby incorporated by reference herein in its entirety.

TECHNICAL FIELD

The disclosed subject matter relates to systems, methods, and media for on-line boosting of a classifier.

BACKGROUND

Automatic detection of certain content in images and/or other forms of data is of ever-increasing importance for machine vision, security, computer-aided diagnosis and other applications. For example, automated detection of anatomic structures is an important functionality for navigating through large 3D image datasets and supporting computer-aided diagnosis (CAD).

A classifier is a mechanism that can be used to perform automatic detection in such applications. Once trained, a classifier can indicate whether an image includes a certain object, such as an anatomic structure. Based on the amount of training, a classifier can exhibit better or worse performance. With an off-line classifier, training must be done in advance of normal use of the classifier, while with an on-line classifier, training can be done concurrently with normal use of the classifier (which training is known as on-line boosting of the classifier). Because of this ability to train, during normal use, and hence continuously improve performance while being used, on-line classifiers are increasing in popularity.

However, known on-line classifiers suffer from many deficiencies. Accordingly, new on-line classifiers are desirable.

SUMMARY

Systems, methods, and media for on-line boosting of a classifier are provided.

In accordance with some embodiments, systems for on-line boosting of a classifier are provided. The systems comprising: a hardware processor that is configured to: receive a training sample; for each of a plurality of features, determine a feature value for the training sample and the feature, use the feature value to update a histogram, and determine a threshold for a classifier of the feature; for each of the plurality of features, classify the training sample using, the threshold for the classifier of the feature and calculate an error associated with the classifier; select a plurality of best classifiers from the classifiers; and, for each of the plurality of best classifiers, assign a voting weight to the one of the plurality of best classifiers.

In accordance with various embodiments of the disclosed subject matter, methods for on-line boosting of a classifier are provided. The methods comprising: receiving a training sample using, a hardware processor; for each of a plurality of features, using the hardware processor, determining a feature value for the training sample and the feature, using the feature value to update a histogram, and determining a threshold for a classifier of the feature; for each of the plurality of features, using the hardware processor, classifying, the training sample using the threshold for the classifier of the feature and calculating an error associated with the classifier; selecting, using the hardware processor, a plurality of best classifiers from the classifiers; and for each of the plurality of best classifiers, assigning a voting weight to the one of the plurality of best classifiers using the hardware processor.

In accordance with some embodiments, a non-transitory computer-readable media containing computer-executable instructions that, when executed by a processor, cause the processor to perform a method for on-line boosting of a classifier are provided. The method comprises: receiving a training sample; for each of a plurality of features, determining a feature value for the training sample and the feature, using the feature value to update a histogram, and determining a threshold for a classifier of the feature; for each of the plurality of features, classifying the training sample using the threshold for the classifier of the feature and calculating an error associated with the classifier; selecting a plurality of best classifiers from the classifiers; and, for each of the plurality of best classifiers, assigning a voting weight to the one of the plurality of best classifiers.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 3 is an example of pseudo-code for a process for updating a classifier in accordance with some embodiments of the disclosed subject matter.

DETAILED DESCRIPTION

In describing exemplary embodiments of the disclosed, subject matter illustrated in the drawings, specific terminology may be employed for the sake of clarity. However, the disclosed subject matter is not intended to be limited to the specific terminology so selected, and it is to be understood that each specific element includes all technical equivalents which operate in a similar manner.

Systems, methods, and media for on-line boosting of a classifier are provided.

Figure 1:
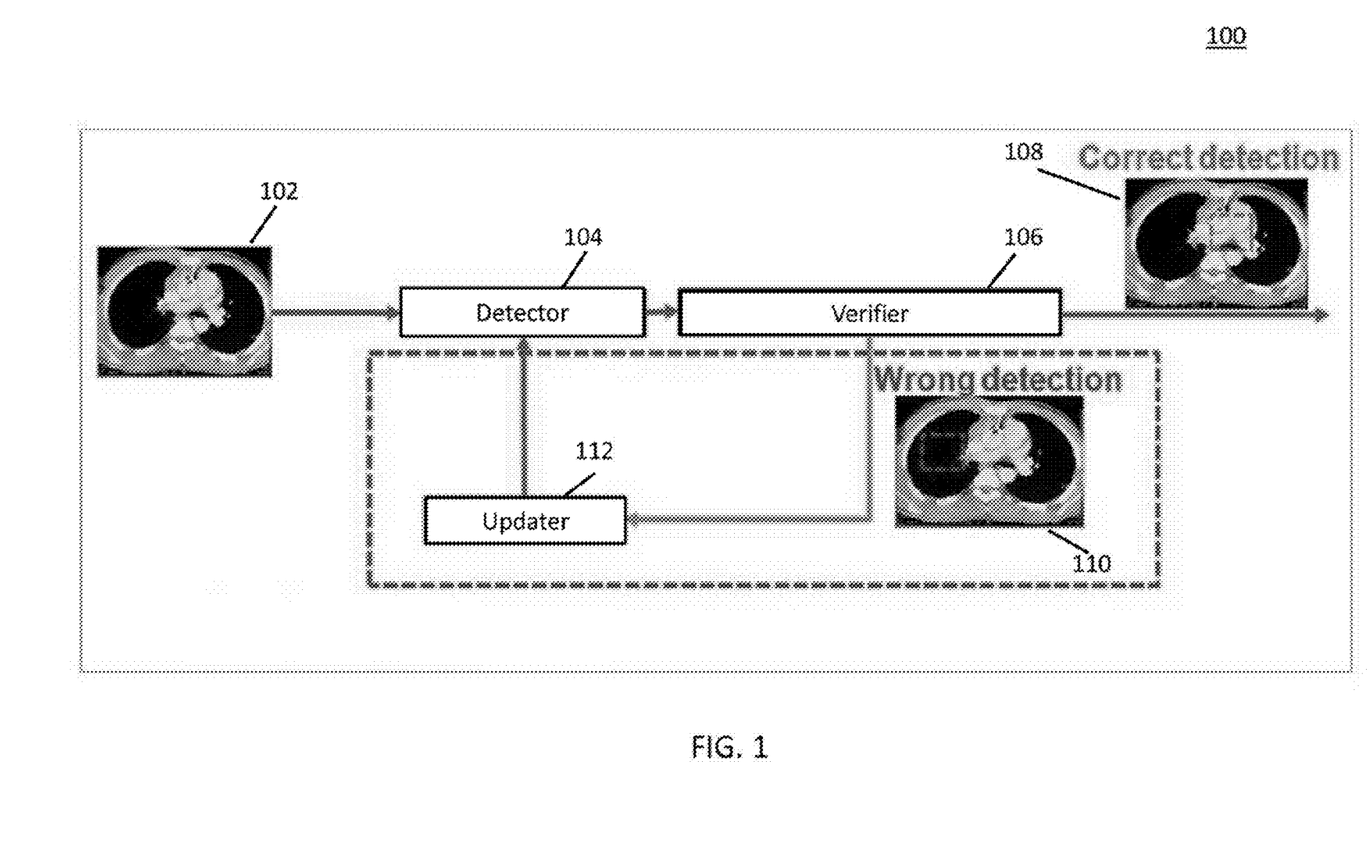
FIG. 1 is an example of a block diagram of a system for classifying images in accordance with some embodiments of the disclosed subject matter.

FIG. 1 illustrates an example of a system 100 that performs classification in accordance with some embodiments. In some embodiments, system 100 can be a computer aided detection system. As illustrated, an input image 102 (such as a medical imaging image of an anatomic structure) can be received and provided to a detector 104. Detector 104 can be a system including a hardware processor that implements a linear classifier of the form:

$$F(x) = \text{sign}\{\Sigma_{j \in \Phi} \alpha_j \times WL_j(x)\},$$

where $WL_j(x)$ is an output returned by a $j^{th}$ weak learner for image x 102, $\alpha_j$ is a voting weight of the $j^{th}$ weak learner, and $\Phi$ denotes the set containing the indices of selected weak learners. This linear classifier can have been configured to detect a certain anatomic structure in input image 102 by having been "trained" as described herein. The classifier can then output a "1" if the sample contains the desired certain anatomic structure, otherwise it can return a "−1".

Because anatomic structures may appear at different scales, the detector may perform a multi-scale search to locate the anatomic structures.

Image 102 and its classification (i.e., "1" or "−1") can then by reviewed by a verifier 106. Verifier 106 can be any suitable mechanism for authoritatively determining whether mage 102 was classified correctly by detector 104 and for specifying a "ground truth" for a desired object (i.e., a true location for the desired object). For example, verifier 106 can be a device through which a radiologist inspects the image and determines whether the certain anatomic structure is in fact present and therefore whether the classification is correct. Images that are correctly classified by detector 104 can be output at images 108. Images that are incorrectly classified by detector 104 can be output as images 110. Images 110 can include the authoritative classification information (i.e., information that indicates the true classification of the images) and the images and information can be provided to an updater 112 for updating the linear classifier in detector 104. Updater 112 can update the linear classifier in any suitable manner, such as that described herein in connection with FIGS. 2 and 3.

In accordance with some embodiments, these mechanisms can be used for automatic detection of anatomic structures using on-line boosting. For example, in some embodiments, these mechanisms can be used to detect a human pulmonary trunk, a human carina, and a human aortic arch.

Figure 2:
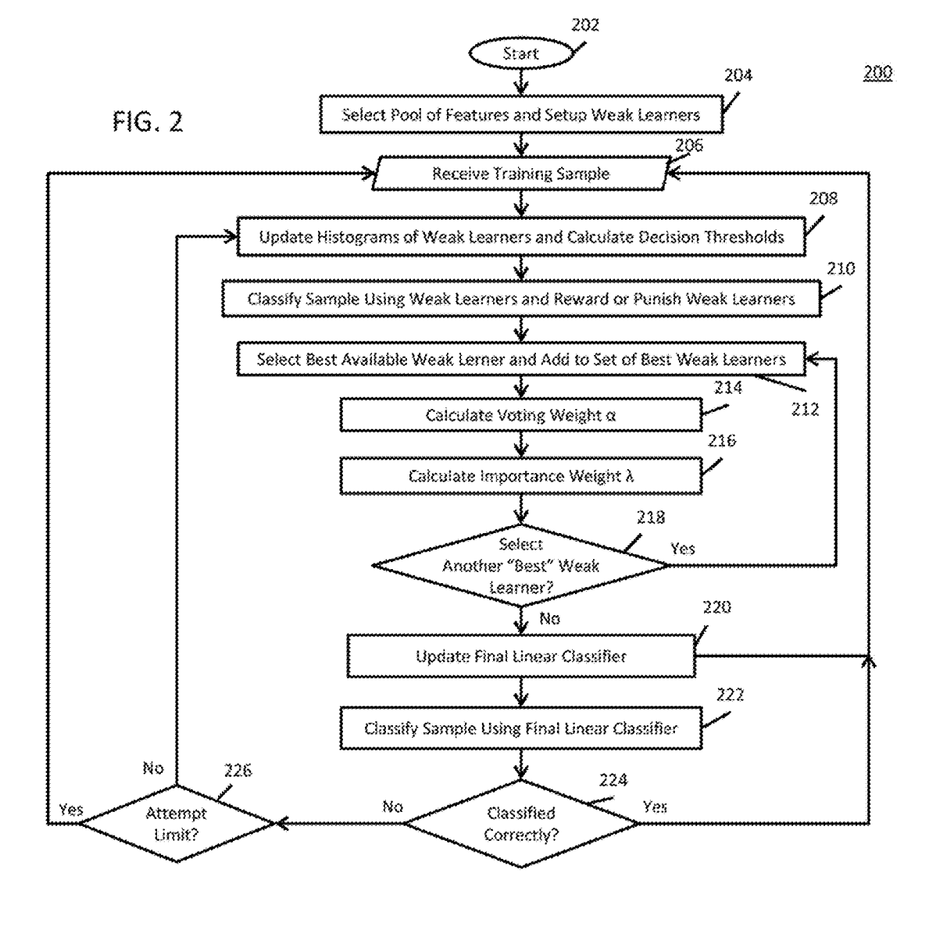
FIG. 2 is an example of a flow diagram of a process for updating a classifier in accordance with some embodiments of the disclosed subject matter.
Figure 4:
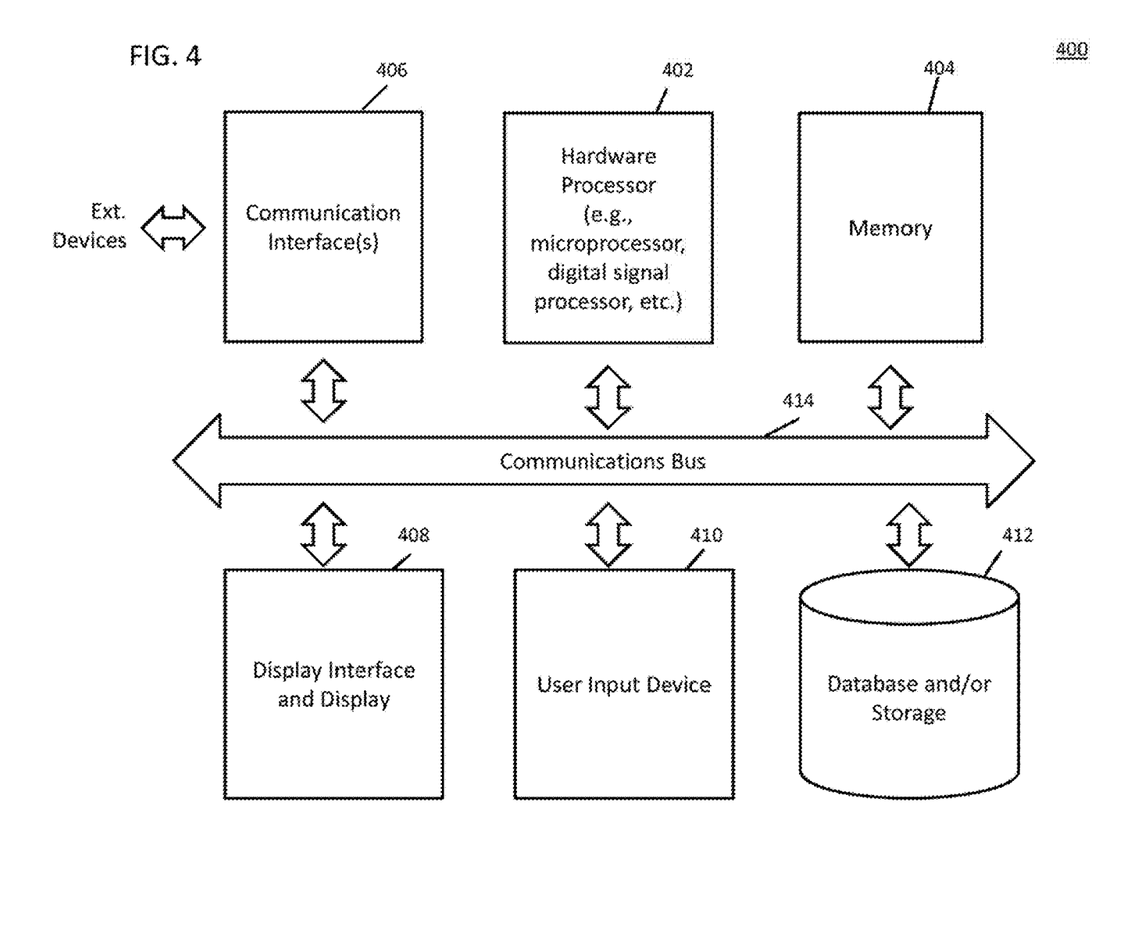
FIG. 4 is an example of a block diagram of hardware for a system for classifying images in accordance with some embodiments of the disclosed subject matter.

Although system 100 and the mechanisms of FIGS. 2, 3, and 4 are described herein in the context of detection of anatomic structures in medical imaging images, it should be apparent to one of ordinary skill in the art that this is just an example of an application of this technology and that this technology can be used for any suitable application. For example, in some embodiments, this technology can be used to classify and/or perform detection in any suitable image or in any suitable data, can be used for real-time object detection and/or real-time object tracking, can be used for intelligent video surveillance, content based image retrieval, face and activity recognition, traffic control, and human-computer interfaces, etc.

As used herein, the term "image" may refer to multi-dimensional data composed of discrete image elements (e.g., pixels for two-dimensional images and voxels for three-dimensional images). The image may be, for example, a medical image of a subject collected using a computer tomography system, a magnetic resonance imaging system, an ultrasound imaging system, or any other medical imaging system or imaging modality known to one of skill in the art. The image may also be provided from non-medical contexts, such as, for example, remote sensing systems, electron microscopy systems, etc. The methods of the disclosed subject matter are not limited to such images, and can be applied to images of any dimension, e.g., a two-dimensional picture, a three-dimensional volume, or a four-dimensional space. For a two-dimensional or three-dimensional image, the domain of the image is typically a two-dimensional or three-dimensional rectangular array, where each pixel or voxel can be addressed with reference to a set of two or three mutually orthogonal axes.

Turning to FIG. 2, a flow diagram of a process 200 for training a classifier that can be used in some embodiments is shown. As illustrated, after process 200 begins at 202, the process can select a pool of features to be used for classification and set-up corresponding weak learners for the features. Any suitable features can be used in some embodiments. For example, in some embodiments, 2D Haar patterns can be used as features for classification. More particularly, for example, in some embodiments, four 2D Haar patterns at different positions, scales, and aspect ratios (and/or any other variations) can be used to form an initial set of 101,400 (or any other suitable number) features, and from this set, 1000 (or any other suitable number) features can be randomly selected to form a pool of features. As another example, in some embodiments, 3D Haar patterns, local binary patterns (LBP), histogram of gradients (HOG), SIFT, or any other suitable patterns, can be used.

Each feature in the pool can then be assigned a weak learner. Any suitable weak learner can be used in some embodiments. For example, in some embodiments, a weak learner can be implemented using a decision stump that compares a feature value for a sample and the feature to a threshold for the feature that is dynamically set based on two histograms for the feature: one for positive samples; and one for negative samples.

Any suitable feature can be used and the feature value can be calculated in any suitable manner. For example, in some embodiments, when using 2D Haar patterns, a feature value for a feature can be calculated as the sum of the intensities of all sample pixels corresponding to white pixels in the Haar pattern for the feature minus the sum of all sample pixels corresponding to black pixels in the Haar pattern for the feature.

Because samples can be processed sequentially as described below, the two histograms can be incrementally assembled over time in some embodiments. To form the set of bins in the histograms before processing all samples, a range of the feature values for the samples for each feature can be estimated in advance by examining feature values computed from a subset of the samples in some embodiments. Any suitable number of samples can be included in this subset in some embodiments. This subset set can subsequently be discarded and not used in the training the classifier in some embodiments. The estimated range for each feature can then be divided (e.g., equally) into 100 (or any other suitable number) of bins.

Next, the process can receive a training sample at 206. This training, sample can be received in any suitable manner and from any suitable source for any suitable purpose in any suitable format. For example, in some embodiments, such a training sample can be received from a file, from memory, from a computer network, from a scanner, from a video sensor, from a display or display driver, etc. As another example, in some embodiments, when used for detection of anatomic structures, the training sample can be from medical imaging data, such as computed tomography (CT) scan images or any other suitable medical imaging scan images. As still another example, such sample can be received in at any suitable one or more resolutions, in color, in grayscale, etc. From such data, positive and negative samples can be extracted and resized to any suitably sized sub-images (such as 25×25 pixel images, for example). Any suitable number of positive and negative samples (such as 4000 each) can be used in some embodiments. The positive samples can be selected at, and/or up to some distance away (e.g., such as 5 pixels away) from, the ground truth (i.e., a known-accurate center point) of desired structures, and negative samples can be randomly selected such that the desired structures are not included, in some embodiments.

At 208, histograms of the weak learners can then be updated based on the training sample and new decision thresholds can be calculated, in some embodiments. More particularly, for example, for each feature in the pool of features, when a training sample arrives, the feature's value for the sample can be calculated, and, depending on the sample's label as being a positive sample or a negative sample, the pertinent histogram can be selected, the bin to which the sample belongs can be determined, and the frequency of the associated bin can be updated, in some embodiments. Any training samples whose feature values fall beyond the lower range or the upper range of the bin can be assigned to the first bin or the last bin, respectively, in some embodiments. Once the histograms are updated, each feature's decision threshold can be defined as the intersection of the positive and negative histograms for that feature. These thresholds are chosen among the histograms bins such that maximum classification rate is obtained.

Each updated weak learner can then classify the sample and be rewarded or punished with the sample's importance weight λ for a correct or wrong classification, respectively, at 210, in some embodiments. The importance weight λ can initially be set to 1 and can subsequently be updated during the learning process at 216 as described below. The rewards and punishments a weak learner receives can be accumulated in $\lambda^{corr}$ and $\lambda^{wrong}$, respectively, and $\lambda^{corr}$ and $\lambda^{wrong}$ can be used to calculate the error rate of each weak learner as follows:

$$\text{error}_m = \frac{\lambda_m^{wrong}}{\lambda_m^{corr} + \lambda_m^{wrong}},$$

where in is an index for the weak learner.

Next, at 212, process 200 can select the best weak learner that has not been previously selected as a best weak learner for the present sample, in some embodiments. This best weak learner can be selected as the weak learner having the least error rate. In some embodiments, this best weak learner can be selected as the weak learner having the best Gini index, entropy, sensitivity, specificity, and/or any other characteristic. The selected weak learner can then be added to the set Φ that contains the best weak learners selected so far. Any suitable number of best weak learners can be selected in some embodiments. For example, in some embodiments, 100 best weak learners can be selected.

Once a best weak learner has been chosen, its corresponding voting weight can be computed at 214, in some embodiments. The voting weight can impact the extent to which the selected best weak learner contributes to the final classifier (which is a linear classifier that is a weighted combination of the best weak learners). The voting weight $\alpha_n$ (n>=N), corresponding to the $n^{th}$ best weak learner, can be given by $$\alpha_n = \frac{1}{2}\ln\left(\frac{1-\text{error}_{m*}}{\text{error}_{m*}}\right),$$

where m* denotes the best weak learner index (m*>=M).

Next, according to the classification outcome and error rate of the selected best weak learner, the importance weight λ can be updated. The importance weight can increase for a wrong classification and decrease for a correct classification. For example, for a wrong classification, the important weight λ can be updated as:

$$\lambda = \frac{\lambda}{2(\text{error}_{m*})}$$

and for a correct classification, the importance weight λ can be updated as:

$$\lambda = \frac{\lambda}{2(1-\text{error}_{m*})}$$

in some embodiments.

After the importance $\lambda^{weight}$ has been updated at 216, process 200 can determine at 218 whether another best weak learner is to be selected. This determination can be made on any suitable basis. For example, this determination can be made based on a count (such as 100) of best weak learners selected for the present sample so far. If another best weak learner is to be selected, process 200 can branch back to 212.

Otherwise, process 200 can update the final linear classifier at 220 using the selected N best weak learners in some embodiments. For example, in some embodiments, the final linear classifier can be defined as:

$$F(x) = \text{sign}\{\Sigma_{j \in \Phi} \alpha_j \times WL_j(x)\}$$

where $WL_j(x)$ is the output returned by $j^{th}$ best weak learner for sample x, $\alpha_j$ is the voting weight of $j^{th}$ best weak learner, and Φ denotes the set containing the indices of selected best weak learners. The classifier outputs a "1" if the sample contains the desired object, otherwise it returns a "−1".

Next, at 222, process 200 can classify the present sample using the final linear classifier in some embodiments.

At 224, the process can determine whether the present sample was classified correctly in some embodiments. If so, then process 200 can loop back to 206 to receive the next training sample. Otherwise, process 200 can branch to 226 to determine if a final classification attempt limit has been met for the present sample. Any suitable attempt limit, such as five (or any other suitable number) attempts, can be used in some embodiments. If the attempt limit has not been met, then process 200 can loop back to 208. Otherwise, the process can loop back to 206.

It should be understood that the above steps of the flow diagrams of FIG. 2 may be executed or performed in any order or sequence not limited to the order and sequence shown and described in the figure. Also, some of the above steps of the flow diagrams of FIG. 2 may be executed or performed substantially simultaneously where appropriate or in parallel to reduce latency and processing times.

FIG. 3 shows an example of pseudo-code corresponding to portions of process 200 of FIG. 2 in accordance with some embodiments.

In accordance with some embodiments, any suitable hardware and/or software can be used to perform the mechanisms described herein (such as those illustrated in, and described in connection with, FIGS. 1, 2, and 3). For example, a general purpose device such as a computer or a special purpose device such as a client, a server, etc. can be used to execute software for performing the mechanisms described herein. Any of these general or special purpose devices, such as device 400 of FIG. 4, can include any suitable components such as a hardware processor 402 (which can be a microprocessor, digital signal processor, a controller, etc.), memory 404, communication interfaces 406, a display interface and display 408, user input devices 410, a database and/or storage 412, a communications bus 414, etc. Communications interfaces 406 can enable the hardware and/or software to communicate with other communications networks (e.g., such as the Internet, wired networks, wireless networks, etc.), other equipment (e.g., such as medical scanning (e.g., such as a computed tomography scanner) diagnosis, display, etc. equipment), and/or any other suitable networks, devices, etc. This hardware and/or software can be implemented as part of other equipment (e.g., such as medical scanning (e.g., such as a computed tomography scanner), diagnosis, display, etc. equipment) or can be implemented as stand-alone equipment (which can be coupled to other equipment).

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Bin-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims which follow. Features of the disclosed embodiments can be combined and rearranged in various ways.

What is claimed is:

1. A system for on-line boosting of a classifier, comprising:
a hardware processor that is configured to:
   access a selection of a plurality of image features for the classifier;
   receive an online training sample not used to select the plurality of image features;
   for each of the plurality of image features:
      determine a feature value for the online training sample and the feature using the online training sample;
      determine one of a plurality of bins of a histogram that corresponds to the online training sample based on the feature value for the online training sample, wherein:
         when the feature value falls below a lower range of the plurality of bins, a lowest bin in the plurality of bins is determined to be the one of the plurality of bins; and
         when the feature value falls above an upper range of the set of bins, a highest bin in the plurality of bins is determined to be the one of the plurality of bins;
      use the feature value to update the one of the plurality of bins of the histogram; and
      determine a threshold for a classifier of the feature;
   for each of the plurality of image features, classify the training sample using the threshold for the classifier of the feature and calculate an error associated with the classifier;
   select a plurality of best classifiers from the classifiers, wherein each of the plurality of best classifiers have not been previously selected as a best classifier; and
   for each of the plurality of best classifiers, assign a voting weight to the one of the plurality of best classifiers that contributes to a final classifier, wherein the final classifier is a linear classifier that is a weighted combination of the plurality of best classifiers.

2. The system of claim 1, wherein the hardware processor is also configured to use the plurality of best classifiers and the voting weights to perform classification.

3. The system of claim 1, wherein the classification is performed using a linear classifier.

4. The system of claim 1, wherein the hardware processor is also configured to:
   calculate an importance weight for the classifier of one of the plurality of features; and
   use the importance weight to calculate the error of the classifier of another of the plurality of features.

5. The system of claim 1, wherein the training sample is a medical imaging image.

6. The system of claim 5, wherein the medical imaging image is a computed tomography image.

7. The system of claim 1, wherein each of a plurality of features is a Haar pattern.

8. A method for on-line boosting of a classifier, comprising:
   accessing a selection of a plurality of image features for the classifier;
   receiving an online training sample using a hardware processor not used to select the plurality of image features;
   for each of the plurality of image features, using the hardware processor:
      determining a feature value for the online training sample and the feature using the online training sample;
      determining one of a plurality of bins of a histogram that corresponds to the online training sample based on the feature value for the online training sample, wherein:
         when the feature value falls below a lower range of the plurality of bins, a lowest bin in the plurality of bins is determined to be the one of the plurality of bins; and
         when the feature value falls above an upper range of the set of bins, a highest bin in the plurality of bins is determined to be the one of the plurality of bins;
      using the feature value to update the one of the plurality of bins of the histogram; and
      determining a threshold for a classifier of the feature;
   for each of the plurality of image features, using the hardware processor, classifying the training sample using the threshold for the classifier of the feature and calculating an error associated with the classifier;
   selecting, using the hardware processor, a plurality of best classifiers from the classifiers, wherein each of the plurality of best classifiers have not been previously selected as a best classifier; and
   for each of the plurality of best classifiers, assigning, using the hardware processor, a voting weight to the one of the plurality of best classifiers that contributes to a final classifier, wherein the final classifier is a linear classifier that is a weighted combination of the plurality of best classifiers.

9. The method of claim 8, further comprising using the plurality of best classifiers and the voting weights to perform classification using the hardware processor.

10. The method of claim 8, wherein the classification is performed using a linear classifier.

11. The method of claim 8, further comprising:
calculating an importance weight for the classifier of one of the plurality of features using the hardware processor; and
using the importance weight to calculate the error of the classifier of another of the plurality of features using the hardware processor.

12. The method of claim 8, wherein the training sample is a medical imaging image.

13. The method of claim 12, wherein the medical imaging image is a computed tomography image.

14. The method of claim 8, wherein each of a plurality of features is a Haar pattern.

15. A non-transitory computer-readable medium containing computer-executable instructions that, when executed by a processor, cause the processor to perform a method for on-line boosting of a classifier, the method comprising:
accessing a selection of a plurality of image features for the classifier;
receiving an online training sample not used to select the plurality of image features;
for each of the plurality of image features:
determining a feature value for the online training sample and the feature using the online training sample;
determining one of a plurality of bins of a histogram that corresponds to the online training sample based on the feature value for the online training sample, wherein:
when the feature value falls below a lower range of the plurality of bins, a lowest bin in the plurality of bins is determined to be the one of the plurality of bins; and
when the feature value falls above an upper range of the set of bins, a highest bin in the plurality of bins is determined to be the one of the plurality of bins;
using the feature value to update the one of the plurality of bins of the histogram; and
determining a threshold for a classifier of the feature;
for each of the plurality of image features, classifying the training sample using the threshold for the classifier of the feature and calculating an error associated with the classifier;
selecting a plurality of best classifiers from the classifiers, wherein each of the plurality of best classifiers have not been previously selected as a best classifier; and
for each of the plurality of best classifiers, assigning a voting weight to the one of the plurality of best classifiers that contributes to a final classifier, wherein the final classifier is a linear classifier that is a weighted combination of the plurality of best classifiers.

16. The non-transitory computer-readable medium of claim 15, wherein the method further comprises using the plurality of best classifiers and the voting weights to perform classification.

17. The non-transitory computer-readable medium of claim 15, wherein the classification is performed using a linear classifier.

18. The non-transitory computer-readable medium of claim 15, wherein the method further comprises:
calculating an importance weight for the classifier of one of the plurality of features; and
using the importance weight to calculate the error of the classifier of another of the plurality of features.

19. The non-transitory computer-readable medium of claim 15, wherein the training sample is a medical imaging image.

20. The non-transitory computer-readable medium of claim 19, wherein the medical imaging image is a computed tomography image.

21. The non-transitory computer-readable medium of claim 15, wherein each of a plurality of features is a Haar pattern.

* * * * *